United States Patent
Sidoti et al.

(10) Patent No.: US 6,896,925 B2
(45) Date of Patent: May 24, 2005

(54) COOKING SALT FORMULATIONS AND METHODS

(75) Inventors: Christina Sidoti, New York, NY (US); Larry Silver, Oakdale, NY (US)

(73) Assignee: Blue Sky Potions, LLC, New York, NY (US)

( * ) Notice: Subject to any disclaimer, the term of this patent is extended or adjusted under 35 U.S.C. 154(b) by 325 days.

(21) Appl. No.: 09/896,970

(22) Filed: Jun. 29, 2001

(65) Prior Publication Data

US 2003/0012863 A1 Jan. 16, 2003

(51) Int. Cl.$^7$ ................................................ A23L 1/237
(52) U.S. Cl. ........................ 426/649; 426/509; 426/549; 426/648
(58) Field of Search ............................ 426/72, 74, 549, 426/555, 557, 560, 506, 509, 516, 517, 648, 649, 806

(56) References Cited

U.S. PATENT DOCUMENTS

| | | |
|---|---|---|
| 4,368,210 A | 1/1983 | Murakami et al. |
| 4,597,976 A | 7/1986 | Doster et al. |
| 4,840,808 A | 6/1989 | Lee et al. |
| 5,380,540 A | 1/1995 | Yamanaka et al. |
| 5,447,732 A | 9/1995 | Tanimoto et al. |
| 5,738,891 A | 4/1998 | Andreae et al. |
| 5,811,147 A | 9/1998 | Yamada |
| 6,001,407 A | 12/1999 | Lewis et al. |
| 6,022,575 A | 2/2000 | Lee et al. |
| 6,106,882 A | 8/2000 | Oh et al. |
| 6,123,013 A | 9/2000 | Ruggiero |
| 6,146,682 A | 11/2000 | Oh et al. |

OTHER PUBLICATIONS

V. Roa and M.S. Tapia. "Estimating Water Activity in Systems Containing Multiple Solutes Based on Solute Properties" Journal of Food Science, 63(4): p. 559–564, 1998.

*Primary Examiner*—Leslie Wong
(74) *Attorney, Agent, or Firm*—Henry D. Coleman; R. Neil Sudol; William J. Sapone

(57) ABSTRACT

The present invention relates to cooking salt formulations and related additives and aqueous cooking compositions to be used to prepare foods. Various foods including pasta, rice, fresh and frozen vegetables and meats may be instilled with unexpectedly desirable organoleptic qualities by cooking the food in water containing effective concentrations of salt formulations according to the present invention. Methods for cooking food are another aspect of the present invention.

30 Claims, No Drawings

COOKING SALT FORMULATIONS AND METHODS

FIELD OF THE INVENTION

The present invention relates to cooking salt formulations and related additives to be used to prepare foods. Various foods including pasta, rice, fresh and frozen vegetables including rices, lentils, beans and other legumes, soups, and meats and poultry may be instilled with desirable organoleptic qualities by cooking the food in water containing effective concentrations of salt formulations according to the present invention. Methods for cooking food are another aspect of the present invention.

BACKGROUND OF THE INVENTION

Presently available methods for cooking pasta and other foods primarily rely on standard practices which are well known in the art. For example, the cooking of pasta, vegetables and other foods using boiling water containing concentrations of sodium chloride (common table salt) which are added to the cooking water is centuries old.

A number of recent methods for reducing cooking time without detracting from the resulting organoleptic qualities of the cooked food have been developed. For example, presently available instant or quick cooking pasta and noodles (pasta products) and other foods are associated with inferior organoleptic qualities. Most of these products are made by extrusion cooking or cooking subsequent to extrusion by immersion in boiling water and/or steam cooking. Extrusion cooking, however, results in deterioration of the pasta texture due to the impact of heat and high shear on the protein matrix prior to and during extrusion. When these products are rehydrated, the texture is mushy or soft, not "al dente", resulting in unfavorable organoleptic qualities. The extrusion cooking process also is costly, requiring sophisticated equipment and control systems.

U.S. Pat. No. 3,251,694 describes a pre-cooked macaroni wherein the dough is made in a conventional manner and the fresh pasta is completely pre-cooked and dried at 300–700.degree. F. for about 3 to 9 minutes. The product, however, is expensive because of high processing costs and is limited to pasta shapes that can be extruded with thin walls and still maintain their shape.

In U.S. Pat. No. 3,615,677, a rapid cooking pasta is made by extruding the dough and drying to a moisture content of less than 12% either with humidified air for 12–48 hours or at a temperature from about 150–300.degree. F. for about 5–120 minutes to at least partially gelatinize the starch. Corn flour and soy flour are viewed as being critical ingredients. The specification provides that for high temperature drying the gelatinization of the starch can be effected prior to, during, or after extrusion and that gelatinization should be at least about 10%, with best results at about 10–75%. The product, however, has poor organoleptic qualities.

U.S. Pat. No. 4,368,210 describes instant-cooking dry macaroni and similar dry foods which contain quantities of wheat flour wherein at least 85% of the starch in the product is converted to the α-phase. The products are said to avoid the prior problems associated with mutual sticking as well as deformation of the pieces of pasta.

Several other patents describe pasta products which can be rehydrated quickly but they require complete pre-cooking during the manufacturing process. These include U.S. Pat. No. 2,704,723 wherein the fresh pasta is immersed in boiling water before drying, and U.S. Pat. Nos. 4,044,165, 4,394,397 and 4,540,592 wherein combinations of heat and mechanical stress are used during extrusion processes to fully pre-cook the pasta products. All of these products suffer from poor organoleptic qualities.

A method of coating pasta for providing a firm texture is described in U.S. Pat. No. 5,144,727. The coating composition is a dried coagulated egg white and an edible oil.

U.S. Pat. No. 6,022,575 describe a method to prevent starch retrogradation in pasta products using propylene glycol alginate and salt.

U.S. Pat. Nos. 6,146,682 and 6,106,882 describe a method of drying freshly extruded pasta by toasting (i.e. using heated ambient air without added moisture) pasta under controlled conditions to prepare a product having excellent appearance and texture with superior cooked yield and short cook times.

U.S. Pat. No. 6,001,407 to Lewis, et al. describes dehydrated vegetable pieces containing a mixture of sodium chloride and an alkali metal carboxylate. The vegetables are said to have favorable organoleptic qualities after quick cooking.

OBJECTS OF THE INVENTION

It is an object of the invention to provide formulations in dry and/or liquid form which may be added to water to be used to cook food.

It is another object of the invention to provide a method for cooking food using novel salt formulations which result in food exhibiting unexpectedly favorable organoleptic qualities.

These and/or other objects of the invention may be readily gleaned from the description of the invention which is presented herein.

BRIEF DESCRIPTIONS OF THE INVENTION

The present invention relates to a prepackaged salt mixture in dry or concentrated aqueous (liquid) form to be added to water which is to be used to cook food, preferably vegetables, meat or pasta. The salt mixture comprises water soluble food grade salts providing at least two of the following four cations at the following concentrations (based on the cation concentration), as indicated:

1. Calcium as a divalent cation in an amount when used, effective to produce a concentration in water after mixing, of about 5 to about 150–200 mg/L (preferably, about 50 to about 85, even more preferably about 65 to about 75 and most preferably about 70 mg/L);

2. Magnesium as a divalent cation in an amount when used, effective to produce a concentration in water after mixing, of about 5 to about 50–100 mg/L, (preferably, about 10 to 35, more preferably about 15 to 25 and most preferably about 20.5 mg/L);

3. Zinc as a cation (preferably, a divalent cation) in an amount when used, effective to produce a concentration in water after mixing, of about 0.05 to about 0.35–0.50 mg/L (preferably, about 0.10 to about 0.25, more preferably about 0.15 to about 0.20, most preferably about 0.17 mg/L); and 4. Copper as a cation (preferably, a divalent cation) in an amount when used, effective to produce a concentration in water after mixing with water, of about 0.01 to about 0.30 mg/L (preferably, about 0.05 to about 0.20, more preferably about 0.075 to about 0.15, most preferably about 0.08–0.10 mg/L), with the proviso that when the composition comprises only two cations, those cations are calcium and magnesium. Preferably, at least three of the four cations are used and more preferably all four cations are used in the compositions according to the present composition.

In addition to the above described cations at the indicated concentrations, other cationic components of the compositions according to the present invention include one or more of sodium and potassium in amounts which produce final concentrations in cooking water preferably ranging from about 1.0 to about 25 mg/L, more preferably about 1.0 to about 10.0 mg/L, even more preferably from about 5.0 to about 10 mg/L, most preferably about 7.0 mg/L. In certain embodiments, the amount of sodium may be as high as several grams per liter (i.e., up to about 1,500 mg/L or even more), but in certain preferred embodiments, and in particular, low sodium versions of the present invention, the amount of sodium will be even less than about 1.0 mg/L, approaching zero.

Minor amounts of iron, manganese, or barium cations may also be included in amounts which generally produce final concentrations in cooking water of less than about 0.2 mg/L (preferred range about 0.001 to about 0.2 mg/L), more preferably less than about 0.02 mg/L. Trace quantities of other cations such as chromium, boron, cobalt, molybdenum, nickel, vanadium and tin minor, often trace amounts which produce concentrations in the cooking water of less than about 0.01 mg/L may also be included in compositions according to the present invention, primarily for the benefit they instill as nutrititional minerals (generally, at or below recommended daily amounts). Cations which are heavy metals such as lead, mercury, cadmium, arsenic and aluminum are to be avoided in the present invention, although in some less preferred embodiments or aspects of the present invention, trace amounts of one or more of these may be present, although undesirable.

The salts which find use in the present invention utilize anions selected from the group consisting of one or more of gluconate, citrate, malonate, succinate, lactate, phosphate, chloride, sulfate, fluoride, nitrate, carbonate, and mixtures, thereof, with preferred anions being gluconate, citrate, phosphate, chloride and mixtures thereof. Although minor concentrations of nitrates and sulfates may also be included (generally, less than about 10 mg/l), in many instances these anions are preferably excluded from salt compositions according to the present invention. Also, minor amounts (i.e., at or below recommended dailing amounts) of selenite (selenium) in the form of sodium selenite may be added to the compositions according to the present invention for its nutritional benefits. The anionic concentration of the compositions according to the present invention will be determined primarily by the concentration or amounts of cations which are used in the present compositions (i.e., the anions serve as counter ions to the cations in the salts to be included in compositions according to the present invention) the concentration of anions included in formulations according to the present invention will generally be a function of the salts which are used in the present invention and the valence of the cations and anions chosen. By way of example, one of ordinary skill in the art will recognize that an anionic monovalent counterion to a divalent cation will be used at a final concentration (in molar equivalents) which is twice the concentration of the divalent cation used. Conversely, an anionic divalent counterion to a monovalent cation will be used at a final concentration (in molar equivalents) which is one-half the concentration of the monovalent cation used. Likewise, an anionic monovalent or divalent counterion to, respectively, a monovalent or divalent cation will be used at a final concentration equal to the concentration of the divalent cation used.

In certain instances, all of the salts which are added to the compositions and ultimately the cooking water according to the present invention have a single anion associated in salt form. Preferably, the salts which are used in the present invention are gluconate or citrate salts, wherein the anionic counterion in the salt is gluconate and/or citrate and the cation is selected from the group of cations otherwise described above. Food grade salts are preferable for use in the present invention. Most preferred are salts which are GRAS (generally recognized as safe).

The final cooking water which is prepared using compositions according to the present invention preferably has a pH which ranges from about 5.0 to about 9.0, preferably about 7.0 to about 8.5, and is mostly preferably weakly alkaline, having a pH ranging from about 7.5 to about 8.5, most preferably about 8.0.

The present compositions, when added to water in which food, such as pasta and fresh vegetables are to be cooked, comprise effective amounts of food grade water soluble salts of calcium and magnesium and optionally, zinc salts and copper salts. In addition, other water soluble salts may also be included, such as sodium salts and minor amounts of such salts as iron, manganese, or barium salts. Trace quantities of chromium salts and other salts may also be used for their nutritional benefits (although toxic heavy metal salts such as arsenic, cadmium, mercury and lead should obviously be avoided), although these may readily be avoided, unless included in the compositions according to the present invention in amounts consistent with their beneficial health effects. Although salt compositions according to the present invention may contain trace quantities of other types of salts, including for example, cadmium, arsenic or lead salts, these are preferably to be avoided. Additional elements which may be added to the present compositions for nutritional value include, for example selenium (which may be included as a cation or an anion, depending upon the addtive chosen), among others, including heat resistant nutritional supplements. A heat resistant nutritional supplement is known as an additive which has nutritional/biological activity, is added to the present compositions for its known benefits in promoting nutritional health and which resistant to degradation at cooking temperatures. Various vitamins, cofactors, and the like, among numerous others, fall within this category.

Salts which are used in the present compositions are any water soluble food grade salts for example, those which are selected from the group consisting of gluconate, citrate, malonate, succinate, lactate, phosphate, chloride, sulfate, fluoride, nitrate, carbonate, and mixtures of these salts, with preferred salts being selected from gluconate, citrate, phosphate, chloride and mixtures, thereof. Most preferably, gluconate and/or citrate salts are used in the present invention.

The present invention may be in the form of a solid or "salt" form, a concentrated aqueous solution which may be added to water to produce final cooking water according to the present invention, or a final cooking water form which is formed or produced by adding and mixing the solid or concentrated aqueous composition to tap water, spring water or other source of water. Methods of producing compositions according to the present invention are also contemplated which comprise adding and mixing the salts to be included in the final formulation in desired amounts to produce a solid or salt composition, concentrated aqueous composition or final cooking water composition.

The present invention also relates to cooking water aspects and methods of cooking wherein said salt compositions are dissolved in water and the water is heated to an appropriate temperature for cooking (in many instances, this temperature preferably will be a boiling temperature or about 85–90° to 150° C.) and the food is cooked for a time and at a temperature which is appropriate for providing a cooked food product having unexpectedly favorable organoleptic qualities. In the case of cooked pasta, these favorable organoleptic qualities include, for example, texture, taste and an absence of clumping and/or a starchy taste. In certain instances, the pasta has a buttery or butter-like flavor without butter having been added to the cooking water. In the case of vegetables, including lentils, beans and other legumes, these favorable characteristics include, for example, superior flavor, texture, crispness and color. In the case of meats, such as beef, pork, chicken, lamb and fish, including shellfish, these favorable characteristics include texture, taste and color.

In certain aspects according to the present invention where nutritional concentrations of minerals are added as supplements to the present compositions, the compositions provide not only superior organoleptic qualities to the food which is cooked in the water, but a superior nutritional quality as well.

DETAILED DESCRIPTION OF THE INVENTION

The following definitions shall be used throughout the specification to describe the invention of the present application.

The term "food" shall mean any type of food which is or may be cooked in water including pasta, rice, couscous, vegetables, including lentils, beans and other legumes, eggs, meat, broth or soup and dairy products, among numerous others.

The term "pasta" is used to describe the macaroni products which are to be cooked or have been cooked in the cooking water according to the present invention. The macaroni products of the present invention include, for example, food products of dried units of dough made from semolina, durum flour, farina, flour, or any combination of these with water and optionally other ingredients such as egg white, disodium phosphate, seasonings such as onion, celery, garlic, bay leaf, parsley or the like, gum gluten, sodium chloride (table salt) or concentrated glyceryl monostearate, among numerous other additives. Pasta for use in the present invention includes, for example, tube-shaped macaroni with a hollow interior, cord-shaped spaghetti or the smaller vermicelli, as described in 21 CFR 139.110 (1978, or later versions, where relevant), relevant portions of which are incorporated by reference herein, or numerous other types of pasta well known in the art, including all types of noodles. For purposes of the present invention, couscous and related products are considered pasta.

The term "vegetable" is used throughout the specification to describe vegetables which are cooked in water according to the present invention, prior to being eaten. Exemplary vegetables which may be cooked using the compositions according to the present invention include asparagus, beets, broccoli, brussel sprouts, cabbage, carrots, legumes, including including green beans, black beans, red beans, canellini beans, kidney beans, peas, lentils, other legumes, celery, egg plant, ginger, mushrooms, onions, peppers, parsnip, parsley, peas, corn, tomatoes, turnips and zucchini, among numerous others. For purposes of the present invention, potatoes, squash and rice (including all the various types of rice) are considered vegetables. The term "legumes" shall be subsumed under the general term vegetables and specifically is directed to the fruit of plants of the pea family, including lentils, beans, such as green beans, black beans, brown beans, lima beans, red beans and kidney beans and various peas, among numerous other types of legumes. The term "rice" shall include all types of rice, such as white rice, brown rice, short and long grain rice, basmati and aboryo (risotto), among numerous others.

The term "meat" or "meats" is used throughout the specification to describe meats, poultry, fish and game which are cooked in water according to the present invention, prior to being eaten. Exemplary meats include beef, lamb or mutton, venison and other game, pork, chicken, turkey, pheasant, squab, fish, including shellfish, among other types of meat.

The term "salt" is used to describe water soluble compounds which comprise a cation and an anion complexed together through ionic interactions, generally in crystalline form, which is used in compositions according to the present invention to produce cooking water used to cook food having superior organoleptic qualities.

The term "cation" is used to describe a mono-, di- or trivalent positively charged ion which is part of the salt complex in ionic association with an anion. Exemplary cations which comprise salts according to the present invention include, for example $Ca^{++}$ and $Mg^{++}$ and optionally, one or more of $Zn^{++}$, $Cu^{++}$, $Fe^{++}$ or $Fe^{+++}$, $Mn^{++}$ and $Ba^{++}$, among others.

The term "anion" is used to describe a mono-, di- or trivalent negatively charged ion which is part of the salt complex in ionic association with a cation. Exemplary anions which comprise salts according to the present invention include gluconate, citrate, malonate, succinate, lactate, phosphate, chloride, sulfate, fluoride, nitrate, carbonate, and mixtures of these salts, with preferred salts being selected from gluconate, citrate, phosphate, chloride and mixtures, thereof, more preferably gluconate and/or citrate salts. Most preferably, gluconate salts are used in the present invention.

The term "cook" or "cooked" is used to describe the process of preparing food by exposing uncooked food to cooking water at an appropriate temperature and for a time sufficient such that the food may be eaten.

The term "organoleptic" is used to describe characteristics of cooked food according to the present invention which relate to one or more of the flavor, taste, smell, color and texture of the cooked food and its impression on an individual who is about to eat or is eating the cooked food. Included within the invention is the fact that the organoleptic qualities of the pasta cooked using compositions according to the present invention exhibit a mouth feel or bite of the "al-dente" cooked pasta condition and vegetables and meats exhibit exceptionally favorable coloring and/or texture.

The term "cooking water" is used to describe water to which solid or salt compositions or concentrated aqueous compositions according to the present invention have been added and which is heated to a temperature sufficient for cooking the desired food.

The term "effective" is used to describe amounts of cations and/or other components to be included in compositions according to the present invention, to produce their intended effect, the effect relating to producing an organoleptically pleasing quality of cooked food or to a nutritional benefit of the component.

The term "container" is used to describe a container of any standard material in which water or solid salt compositions is packaged and sold. Accordingly, the container may be a bottle, jug other container which is conventionally used to package salt or liquids.

Compositions according to the present invention are prepared by simply mixing appropriate quantities of water soluble salts or concentrated solutions of such salts with water to produce a final cooking water in proportions which would produce concentrations according to the present invention. Thus, cooking water is prepared by adding one or more salt compositions according to the present invention to water. It is noteworthy, that the type of water which is used to create the cooking water according to the present invention may vary between "hard" and "soft", where "hard" water is water which is high in mineral content, especially sodium, calcium and magnesium and "soft" water is rather low in mineral content and includes spring water and other water low in mineral content. In cases where tap water is used to produce the cooking water according to the present invention, care must be taken to recognize or otherwise establish the concentrations of cations and anions in the water (especially hard water) before adding the salts according to the present invention. Otherwise, the concentration of cations and anions in the resulting cooking water may be considerably higher than the recommended concentrations, resulting in cooked food which is non-optimal in its organoleptic qualities.

The method of cooking food according to the present invention comprises the steps of mixing a water soluble solid salt composition or concentrated aqueous composition according to the present invention into water at ambient or elevated temperature to provide cooking water, raising the temperature of the cooking water to cooking temperature and then exposing food to the cooking water for a period of time sufficient to cook the food, the cooking method instilling the cooked food with favorable organoleptic qualities.

The cooking time of food according to the methods of the present invention will vary with the type of food to be cooked, but will be similar, if not identical, to cooking times using water which does not include the invention of the present application. The cooking time is dependent on the dimensions of the food pieces and the concentration of salts used, with larger dimensions and high salt concentrations generally (but not always) requiring longer cooking times. Thus, cooking times may range from less than one minute to as long as several hours or more. Any cooking appliance, device or apparatus, which is suitable for heating water, may be used to cook food according to the present invention. Preparation of food and cooking methods and times are similar to those used to cook food conventionally.

In the case of pasta, cooking times will range from one minute up to 15 minutes or more, depending upon the thickness and composition (semolina, durum, farin, etc.) in boiling water to which has been added the salt compositions according to the present invention. The resulting pasta has favorable organoleptic qualities including an "al-dente" texture and exceptionally favorable flavor and color. In addition, the pasta prepared pursuant to the present method does not develop the mutual sticking or deformation which often characterizes the cooked pasta of the prior art.

In the case of vegetables, cooking times will range from less than one minute (generally, at least about 10–15 seconds) up to about 15 minutes or more, depending upon the type of vegetable and the cooking temperature. In the case of potatoes, squash and rice, cooking times will generally be longer than other vegetables. One of ordinary skill in the art will readily know how long to cook food according to the present invention, without engaging in undue experimentation. In general, compositions according to the present invention are used in a manner consistent with conventional cooking methods.

In the case of cooked meats, cooking times may range from several minutes to several hours or more. The resulting meat (which includes chicken and fish) exhibits favorable flavor and texture as well as a natural color which enhances the dining experience.

In one aspect of the present invention, a solid composition comprises a mixture of at least two salts containing cations selected from the group consisting of calcium cations, magnesium cations, zinc cations and copper cations, said amount of each of said salts being included within said solid composition in an amount effective, after said composition is thoroughly mixed with water, to provide a final cooking water composition in which food is to be cooked wherein the concentration of calcium cation in said final cooking water composition ranges from about 5 to about 200 mg/L (preferably about 50 to about 85 mg/L, more preferably about 65 to 75 mg/L, most preferably about 70 mg/L), the concentration of magnesium cation ranges from about 5 to about 100 mg/ml (preferably about 10 to about 35 mg/L, more preferably about 15 to about 25 mg/L and most preferably about 20.5 mg/L), the concentration of zinc cation ranges from about 0.05 to about 0.50 mg/L (preferably, about 0.10 to about 0.25 mg/L, more preferably about 0.15 to about 0.20 mg/L, most preferably about 0.17 mg/L) and the concentration of copper cation ranges from about 0.01 mg/L to about 0.30 mg/L (preferably about 0.05 to about 0.20 mg/L, more preferably about 0.075 to about 0.15 mg/L, most preferably about 0.08 to about 0.10 mg/L), with the proviso that when only two salts are used in said composition, said salts comprise calcium salts and magnesium salts.

In preferred solid (salt) compositions according to the present invention, the amount of calcium cation ranges (as a percentage by weight of cation in the final composition) from about 0.5% to about 50% by weight, preferably about 1% to about 20% by weight, more preferably about 5% to about 18.5% by weight, even more preferably about 6 to about 16% by weight;

the amount of magnesium cation ranges from about 0.2% to about 15% by weight, more preferably about 0.5% to about 7.5% by weight, even more preferably about 1% to about 5% by weight;

and where the following cations are used:

the amount of zinc cation ranges from about 0.001% to about 0.20% by weight, more preferably about 0.01% to about 0.05% by weight, even more preferably about 0.01% to about 0.05% by weight;

the amount of copper cation ranges from about 0.001% to about 0.05% by weight, more preferably about 0.002% to about 0.025% by weight, even more preferably about 0.0075 to about 0.008% by weight.

In solid salt compositions according to the present invention, sodium and potassium cations may be included in amounts preferably ranging from about 0.05% to about 10% by weight, preferably about 1% to about 7.5% by weight. Other cations which may be used in minor amounts, such as iron, manganese or barium cations are included in salt compositions according to the present invention in amounts preferably ranging from less than about 0.001% to about 0.01% by weight of the final composition. Trace quantities of other cations including for example, chromium, boron, cobalt, molybdenum, nickel, vanadium and tin are used in amounts which are no greater than about 0.005% by weight of the final solid salt compositions.

In the present solid (salt) compositions according to the present invention, the calcium salts and other salts used in the final salt compositions comprise percentages by weight consistent with the inclusion of the above weight percentages of cations as otherwise described above. Calcium salts preferably range from about 0.5% to about 65% by weight, magnesium salts preferably range from about 0.2% to about 25% by weight, zinc salt preferably range from about 0.001% to about 0.5% by weight, copper salts range from about 0.001% to about 0.2% by weight and the remaining salts are included in amounts consistent with their inclusion as cations as described above.

In addition to solid salt compositions, the present invention also relates to concentrated aqueous salt solutions which may be added to tap water, spring water or other salt water in order to provide cooking water according to the present invention. Concentrated water compositions according to the present invention comprise concentrations of the cations and salts which are otherwise included within the solid salt compositions or the final cooking water compositions according to the present invention except in amounts which would give rise to the desired final concentrations which are found in the final cooking water compositions. Thus, the concentration of, for example, calcium or other ion in a concentrated aqueous salt composition according to the present invention will be a function of how much water is to be added to the concentrated composition to produce a final cooking water composition. Concentrated aqueous compositions according to the present invention may be used at 1× concentration up to 50× or more concentration, preferably about 25× or less, more preferably about 5× to about 15×. The terms 1× and 10×, for example, refer to the fact that final cooking water compositions will be made by adding one part of the aqueous salt composition to one part tap or spring water (1×) or one part of the aqueous composition to ten (10×) parts tap or distilled water. One of ordinary skill will be able to readily adjust the concentrated aqueous compositions of the present invention to produce final cooking water compositions.

Having generally described the invention, reference is now made to the following examples which are intended to illustrate preferred embodiments and comparisons. The included examples are not to be construed as limiting the scope of this invention as is more broadly set forth above and in the appended claims.

EXAMPLES

In order to establish the desirability of using the present salt compositionsin cooking food in order to influence the organoleptic qualities of the resulting food, several experiments were conducted.

Four food grade salts including magnesium gluconate, calcium gluconate, zinc gluconate and copper gluconate (purchased from Glucona America, Inc.) in concentrated salt solution form were each weighed out and amounts were mixed in 1 liter of spring water (Poland Spring, "soft water") in order to prepare a salt "concentrate". The salt "concentrate" was then added to New York City water (a "soft" water source) in pre-determined amounts in order to provide cooking water having the above-concentrations of salt.

The following solutions were prepare and tested: In each solution, the amount of calcium, magnesium, zinc and copper, where used, were as indicated below:

Calcium 69.44 g/L
Magnesium 20.43 mg/L
Zinc 0.09 mg/L
Copper 0.09 mg/L

In a first test system, a solution containing all four cations as described above in city water was compared to a solution made from a city water sample with a pinch of salt added. Two pots of water (4 quarts each) were brought to boiling, each containing one of the two solutions as described above. Both pots were allowed to reach boiling temperature (about 210° F. or 99–100° C.) and the same amount of pasta (about 0.5 lb) was added to the water in each case. The cooking water containing the pasta was then allowed to cool for 15 minutes, whereupon it was transferred to a colander and then taste tested. All seven participants (taste-testers) found that the pasta prepared in the water containing all four cations was markedly superior to the pasta cooked in city water which included a pinch of salt.

To determine whether or not the salt (sodium chloride) concentration was the determining factor in instilling favorable organoleptic qualities to the food cooked in the water, the same experiment was repeated only in this experiment rather than using only a pinch of salt, city water containing a tablespoon of Kosher salt was used. After cooking, all seven participants concluded that the pasta cooked using the salt compositions according to the present invention were markedly superior to the pasta cooked in the high sodium chloride concentration city water.

The next experiment which was performed was designed to determine the impact of removing one of the salts from the four-salt composition as described above from the salt solution and determine the effect of the missing salt on the organoleptic qualities of food cooked in such solutions. Seven samples of cooking water were used to prepare pasta for taste sampling in this experiment. Five samples of cooking water using the invention of the present application were prepared, one containing all four salts at the concentrations set forth above and four additional samples wherein each one of the salts was removed and the other three salts were included at the same concentrations as indicated above. In addition to the above-described five samples of cooking water, one sample containing only city water and another sample containing only sodium gluconate at a concentration which is identical to the concentration of gluconate used in the four salt mixture as prepared above were also used to cook pasta.

The seven different solutions as described above were used to prepare pasta by bringing about 200 ml of each of the samples of the cooking water to a boil (about 99–100° C.) and then cooking the pasta in the water (generally, as otherwise described above.). The seven taste-testing participants in the experiments found that the five samples of pasta cooked using cooking water containing at least three of the salts were vastly superior in organoleptic qualities (in particular, texture and taste) than were the pasta samples which were cooked in water or the sodium gluconate (as the only salt) containing water.

Other informal testing evidenced that the pasta product produced with the present invention was preferred by those involved in the testing.

Taste Test

Subject: Final Results of Consumer Study to Determine Efficacy of Compositions

Objective: Determine Consumer preference of three products made with composition according to the present invention vs. A control product Products Tested: Plain Spaghetti cooked in tap water vs. Spaghetti cooked in water plus the composition according to the present invention. The cooking water composition of the present invention contained the following cations in the indicated amounts

| Salt | Cation | Metal Ion Conc. mg/L | Salt Conc. mg Salt/Liter |
|---|---|---|---|
| Calcium Gluconate | Calcium | 69.44 | 780.220 |
| Magnesium Gluconate | Magnesium | 20.43 | 348.630 |
| Zinc Gluconate | Zinc | 0.17 | 1.241 |
| Copper Gluconate | Copper | 0.09 | 0.640 |
| Sodium Chloride | Sodium | 1144.00 | 2910.00 |

Experiments:

Set 1: Plain Spaghetti cooked in water vs. Spaghetti cooked in water plus the above-referenced cooking water composition of the present invention ("the present invention").

Set 2: Plain Spaghetti cooked in water vs. Spaghetti cooked in water plus the present invention with Classico Tomato and Basil Sauce added to both samples.

Set 3: Fresh broccoli cooked in water vs. Broccoli cooked in water plus the present invention.

Respondents:

Fifty-four (54) consumer/respondents tasted the six test samples. They were men and women ranging in age from 20 to 65. They were screened for liking pasta, red sauce and broccoli. Fifty-three (53) of the 54 respondents replied to additional lifestyle questions regarding frequency of cooking, frequency of pasta use, brand usage and frequency of shopping in gourmet stores. Over half the respondents (27) cooked 5 or more times per week, 14 respondents cooked 3–4 times per week, 10 cooked 1–2 times per week, and 2 didn't cook.

Thirty-four (34) respondents at paste 8 or more times per month, and for many 12–15 times was the norm. Sixteen (16) ate pasta 4–7 times per month, and three ate pasta 1–3 times per month.

Most respondents (39) did not shop in gourmet stores, six shopped once a month or more, and eight shopped in gourmet stores "rarely".

Brand usage included Ronzoni, San Giorgio, Barilla, Prince, Luigi Vitalli and Muellers. Most respondents used multiple brands, and some also used store brands, e.g., ShopRite, Ronzoni (26 people) and Barilla (19 people) were the two most popular brands.

Methodology:

Respondents were given three pairs of samples one pair at a time. First, they saw plain pasta, then pasta with sauce, and then broccoli. The order of samples was randomized so that half the group saw one sample in the first position, and the other half saw it in the second position. Respondents were asked to drink water between the samples.

Conclusions:

The spaghetti cooked in the present invention was significantly preferred over the product cooked in water alone. Results indicate that respondents preferred the sample because it had more flavor, or it had a better flavor. They also liked the texture of the product. Some respondents considered it a bit less starchy/sticky and more moist than the pasta cooked in plain water. Some of those who preferred the product cooked in plain water stated that they liked it because they prefer low or no salt.

When the spaghetti was served with sauce, there was a directional preference, again for the product made with the present invention. Though the same sauce was used on both spaghetti products (i.e. with or without the present invention), some respondents found that the product with pasta cooked in the present invention provided a slightly stronger flavor. The reasons for the preference included "more flavor" and "spicier flavor".

Respondents also showed a significant preference for the broccoli made with the present invention. Although respondents thought that both products had good, fresh flavor, the results indicate that the sample produced with the present invention had more flavor. Some respondents felt that it had been seasoned or that it had a "buttery" flavor, although no butter had been added.

About half the respondents had no dislikes of either broccoli sample. Those who recorded dislikes for the sample prepared using the present invention, most commented on a salty taste. Those respondents who disliked the sample cooked in plain water thought that it lacked flavor.

The statistical results are presented below.

TABLE

PRODUCT PREFERENCES

| SET | Percent Preference | Significance |
|---|---|---|
| Set 1: N = 53 | | |
| Spaghetti cooked in water | 30% | *99% Confidence Level |
| Spaghetti Cooked w/present Invention | 70% | |
| Set 2: N = 54 | | |
| Spaghetti Cooked in water with sauce | 39% | **89% Confidence Level |
| Spaghetti cooked w/present invention in sauce | | |
| Set 3: N = 54 | | |
| Broccoli cooked in water | 35% | #95% confidence level |
| Broccoli cooked in water w/present Invention | 65% | |

Conclusions:
Statistical analysis indicates the following:
*Researchers may conclude with 99% confidence, that the population prefers the sample produced with the present inventnion;
**Researches may conclude with 89% confidence, that the population prefers the sample produced within the present invention; and
Researches may conclude with 95% confidence, that the population prefers the sample produced within the present invention.

It is to be understood by those skilled in the art that the foregoing description and examples are illustrative of practicing the present invention, but are in no way limiting. Variations of the detail presented herein may be made without departing from the spirit and scope of the present invention as defined by the following claims.

What is claimed is:

1. A method of cooking pasta comprising:
    i. preparing a cooking water composition by adding an amount of a salt-containing composition comprising water soluble salts containing calcium, magnesium, zinc and copper cations to a sufficient amount of water to produce said cooking water composition wherein the concentration of calcium cations in said cooking water composition ranges from about 5 mg/L to about 200 mg/L, the concentration of magnesium cations in said cooking water composition ranges from about 5 mg/L to about 100 mg/L, the concentration of zinc cations in said cooking water composition ranges from about 0.05 to about 0.50 mg/L; and the concentration of copper cations in said cooking water composition ranges from about 0.01 mg/L to about 0.30 mg/L;

ii. heating said cooking water composition to cooking temperature;

iii. adding uncooked pasta to said heated composition of step ii for a time sufficient to cook said pasta; and iv. removing said pasta from said heated composition.

2. The method according to claim 1 wherein said calcium cations are included in said cooking water composition in a concentration ranging from about 50 to about 150 mg/L.

3. The method according to claim 1 wherein said magnesium cations are included in said cooking water composition in a concentration ranging from about 10 to about 50 mg/L.

4. The method according to claim 1 wherein said zinc cations are included in said cooking water composition in a concentration ranging from about 0.10 to about 0.25 mg/L.

5. The method according to claim 1 wherein said copper cations are included in said cooking water composition in a concentration ranging from about 0.05 to about 0.20 mg/L.

6. The method according to claim 1 wherein said salt-containing composition further comprises an effective amount of at least one additional cation selected from the group consisting of sodium, potassium, iron, manganese, barium, chromium, boron, cobalt, molybdenum, nickel, vanadium, tin, mixtures thereof, and optionally, a heat resistant nutritional supplement.

7. The method according to claim 6 wherein said additional cation is selected from the group consisting of iron, manganese or barium in an amount less than about 0.2 mg/L of said cooking water composition.

8. The method according to claim 1 wherein said calcium cations range from about 50 to about 85 mg/L, said magnesium cations range from about 10 to about 35 mg/L, said zinc cations range from about 0.10 to about 0.25 mg/L and said copper cations range from about 0.05 to about 0.20 mg/L of said cooking water composition.

9. A method of cooking pasta comprising:

i. preparing a cooking water composition by adding an amount of a salt-containing composition comprising water soluble salts containing calcium, magnesium, zinc and copper cations to a sufficient amount of water to produce said cooking water composition wherein the concentration of calcium cations in said cooking water composition ranges from about 5 mg/L to about 150 mg/L, the concentration of magnesium cations in said cooking water composition ranges from about 10 mg/L to about 100 mg/L, the concentration of zinc cations in said cooking water composition ranges from about 0.10 to about 0.50 mg/L; and the concentation of copper cations in said cooking water composition ranges from about 0.01 mg/L to about 0.30 mg/L;

ii. heating said cooking water composition to cooking temperature;

iii. adding uncooked pasta to the heated composition of step ii for a time sufficient to cook said pasta; and iv. removing said from said heated composition.

10. The method according to claim 9 wherein said salt-containing composition further comprises an effective amount of at least one additional cation selected from the group consisting of sodium, potassium, iron, manganese, barium, chromium, boron, cobalt, molybdenum, nickel, vanadium, tin and mixtures thereof.

11. The method according to claim 9 wherein said salt-containing composition further comprises a heat resistant nutritional supplement.

12. The method according to claim 10 wherein said salt-containing composition further comprises a heat resistant nutritional supplement.

13. The method according to claim 10 wherein said additional cation is selected from the group consisting of iron, manganese or barium in an amount less than about 0.2 mg/L of said cooking water composition.

14. The method according to claim 13 wherein said salt-containing composition further comprises a heat resistant nutritional supplement.

15. A method of cooking pasta comprising:

i. exposing uncooked pasta to a cooking water composition at cooking temperature comprising water-soluble salts containing calcium, magnesium, zinc and copper cations and a sufficient amount of water to produce said cooking water composition wherein the concentration of calcium cations in said cooking water composition ranges from about 5 mg/L to about 150 mg/L, the concentration of magnesium cations in said cooking water composition ranges from about 10 mg/L to about 100 mg/L, the concentration of zinc cations in said cooking water composition ranges from about 0.10 to about 0.50 mg/L; and the concentration of copper cations in said cooking water composition ranges from about 0.01 mg/L to about 0.30 mg/L for a time sufficient to cook said pasta; and ii. removing said cooked pasta from said heated composition.

16. The method according to claim 15 wherein said cooking water composition further comprises an effective amount of at least one additional cation selected from the group consisting of sodium, potassium, iron, manganese, barium, chromium, boron, cobalt, molybdenum, nickel, vanadium, tin and mixtures thereof.

17. The method according to claim 15 wherein said cooking water composition further comprises a heat resistant nutritional supplement.

18. The method according to claim 16 wherein said cooking water composition further comprises a heat resistant nutritional supplement.

19. The method according to claim 16 wherein said additional cation is selected from the group consisting of iron, manganese or barium in an amount less than about 0.2 mg/L of said cooking water composition.

20. The method according to claim 19 wherein said salt-containing composition further comprises a heat resistant nutritional supplement.

21. The method according to claim 1 wherein said pasta is macaroni, spaghetti or vermicelli.

22. The method according to claim 9 wherein said pasta is macaroni, spaghetti or vermicelli.

23. The method according to claim 15 wherein said pasta is macaroni, spaghetti or vermicelli.

24. The method according to claim 6 wherein said nutritional supplement is a vitamin.

25. The method according to claim 11 wherein said nutritional supplement is a vitamin.

26. The method according to claim 12 wherein said nutritional supplement is a vitamin.

27. The method according to claim 14 wherein said nutritional supplement is a vitamin.

28. The method according to claim 17 wherein said nutritional supplement is a vitamin.

29. The method according to claim 18 wherein said nutritional supplement is a vitamin.

30. The method according to claim 20 wherein said nutritional supplement is a vitamin.

* * * * *